United States Patent [19]

Michishita

[11] Patent Number: 5,754,325
[45] Date of Patent: May 19, 1998

[54] OPTICAL REGENERATING CIRCUIT

[75] Inventor: Yukio Michishita, Tokyo, Japan

[73] Assignee: NEC Corporation, Tokyo, Japan

[21] Appl. No.: 623,718

[22] Filed: Mar. 29, 1996

[30] Foreign Application Priority Data

Mar. 31, 1995 [JP] Japan ................ 7-075592

[51] Int. Cl.$^6$ ................................ H04B 10/16
[52] U.S. Cl. .................. 359/176; 359/158; 359/176
[58] Field of Search ........................ 359/158, 174, 359/176, 179

[56] References Cited

U.S. PATENT DOCUMENTS

| | | | |
|---|---|---|---|
| 5,541,766 | 7/1996 | Mizrahi et al. | 359/337 |
| 5,548,433 | 8/1996 | Smith | 359/179 |
| 5,633,743 | 5/1997 | Delavaux | 359/179 |

FOREIGN PATENT DOCUMENTS

| | | |
|---|---|---|
| 0 534 433 A2 | 3/1993 | European Pat. Off. . |
| 0 571 134 A1 | 11/1993 | European Pat. Off. . |
| 0 589 617 A1 | 3/1994 | European Pat. Off. . |
| 5-83200 | 4/1993 | Japan . |
| 5-346599 | 12/1993 | Japan . |

*Primary Examiner*—Leslie Pascal
*Attorney, Agent, or Firm*—Whitham, Curtis & Whitham

[57] ABSTRACT

In a data communication system, a circuit for regenerating an optical signal that is deteriorated during the course of transmission has an optical clock generator for generating an optical clock signal whose frequency is equal to the bit rate of an optical signal input to a preselected port thereof. The clock generator outputs the clock signal via the same port as the optical signal is input. The circuit is capable of regenerating the optical signal while efficiently separating the optical signal and clock signal respectively input to and output from the clock generator.

20 Claims, 3 Drawing Sheets

OPTICAL REGENERATING CIRCUIT

BACKGROUND OF THE INVENTION

The present invention relates to an optical regenerating circuit included in a data communication system for regenerating an optical signal that deteriorated during transmission. More particularly, the present invention is concerned with an optical regenerating circuit capable of regenerating the optical signal in the form of light without transforming it to an electric signal.

In an optical fiber communication system, an optical signal has its waveform weakened, distorted or is otherwise deteriorated during transmission through an optical fiber. This kind of deterioration introduces code errors at a receiving station. For long-distance data transmission, it has been customary to locate repeaters at suitable intervals and cause them to shape the waveform of the optical signal. A conventional 3R repeater, for example, transforms the optical signal to an electric signal, executes reshaping and retiming with the electric signal, transforms the resulting regenerated electric signal to an optical signal, and then sends it out. However, a processing rate available with an electric circuit is limited because it depends on the rate of the circuit. Today, an optical regenerating circuit capable of shaping the waveform in the form of light is attracting increasing attention.

For example, Japanese Patent Laid-Open Publication No. 5-83200 discloses an optical regenerating repeater for regenerating an optical signal in the form of light. The repeater splits an input optical signal, transforms one of the resulting two optical signals to an electric signal, and then separates a clock component. The clock component is used as a timing signal for regenerating the other optical signal. Although the repeater regenerates the optical signal in the form of light, it separates the clock signal after transforming the optical signal to the electric signal. This brings about a problem that the bit rate of the optical signal which can be dealt with is limited by the processing rate of an electric circuit for producing the clock signal.

Japanese Patent Laid-Open Publication No. 5-346599 teaches an optical regenerating circuit for regenerating an input optical signal in association with an optical clock signal. This circuit uses four-photon mixture to occur in an optical fiber. The four-photon mixture refers to a phenomenon that light having a third waveform and satisfying a phase matching condition appears out of two or three lights each having a particular wavelength due to the third-order nonlinear effect available in an optical fiber. For example, assume that an optical signal pulse train (angular frequency of $\omega 1$) and an optical clock pulse train (angular frequency of $\omega 3$) are input to an optical fiber, and that only light having an angular frequency of $\omega 4 (\omega 4 = 2\omega 1 - \omega 3)$ and derived from the four-photon mixture is produced as output light. The four-photon mixture occurs only when the optical signal pulse and optical signal clock pulse are incident at the same time. In this sense, the two signals are ANDed by an optical AND gate. However, the problem is that the light resulting from the four-photon mixture is different in wavelength from the input signal light.

SUMMARY OF THE INVENTION

It is therefore an object of the present invention to provide an optical regenerating circuit capable of splitting with a minimum of attenuation an optical signal and an optical clock signal respectively input to and output from an optical clock generator via the same port, thereby efficiently feeding the clock signal to an optical regenerator.

An optical regenerating circuit of the present invention has an optical directional splitter for receiving an optical signal conveying digital data having a desired bit rate on a first port, producing the optical signal on a second port, and producing an optical signal input to a second port on a third port. An optical clock generator receives the optical signal from the second port on a preselected input/output port, generates an optical clock signal whose frequency is equal to the bit rate of the digital data, and feeds the optical clock signal from the preselected input/output port to the second port. An optical regenerator shapes and regenerates the optical signal conveying the digital information on the basis of the optical clock signal output from the third port.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
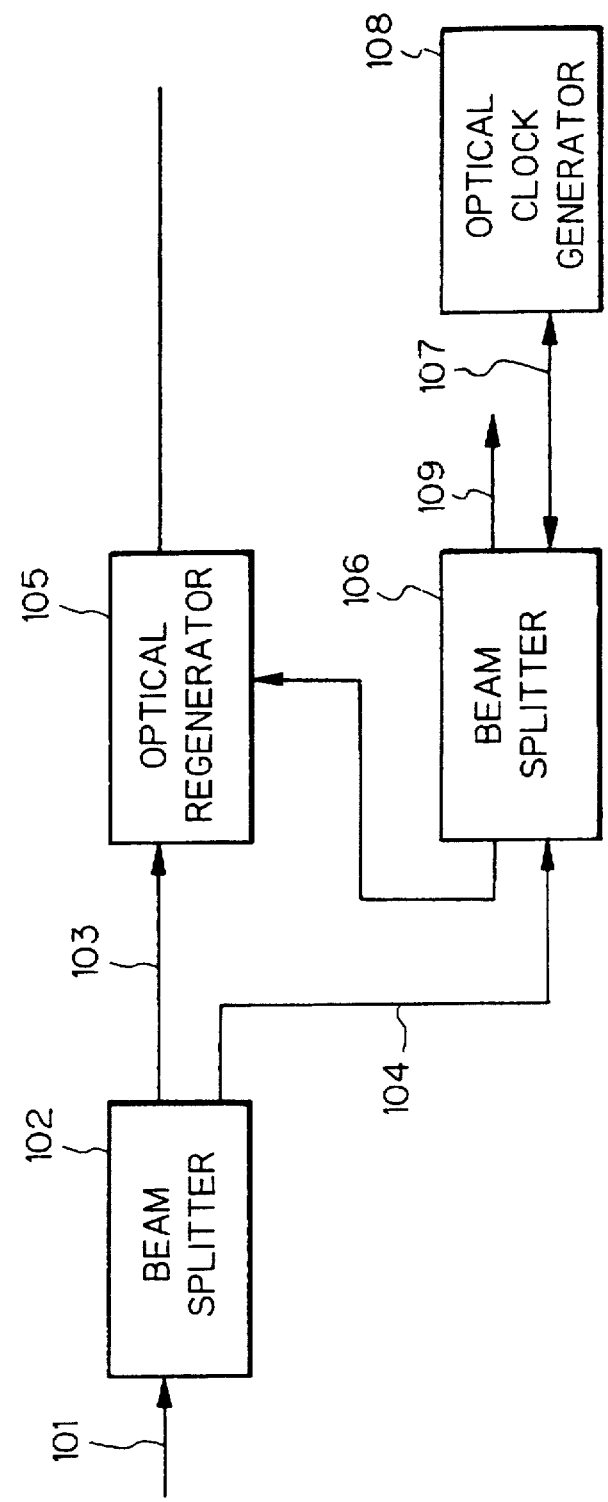
FIG. 1 is a block diagram schematically showing a conventional optical regenerating circuit.

To better understand the present invention, a brief reference will be made to a conventional optical regenerating circuit, shown in FIG. 1. As shown, an optical signal 101 is transmitted through an optical fiber with a preselected bit rate. The waveform of the signal 101 is deteriorated during the course of transmission over a long distance. The signal 101 is split into optical signals 103 and 104 by a beam splitter 102. The signals 103 and 104 are respectively input to an optical regenerator 105 and another beam splitter 106, respectively. One optical signal 107 output from the beam splitter 106 is input to an optical clock generator 108 via an optical fiber. The other optical signal 109 is output from the beam splitter 106 as it is. The optical clock generator 108 generates an optical clock signal on the basis of the input signal 107.

The optical clock generator 108 is implemented by a mode locked laser diode which receives an optical signal on a preselected input/output port thereof and sends an optical clock signal synchronous to a clock component included in the received signal via the same input/output port. The optical clock signal is output via the same port as the input light is incident, and sent to the beam splitter 106 via the fiber 107. The clock signal is routed through the beam splitter 106 to the regenerator 105. The regenerator 105 regenerates the input clock signal in synchronism with the optical signal 103. For the regenerator 105, use may be made of an optical AND gate called a nonlinear optical loop mirror. The optical AND gate ANDs the input optical clock signal and optical signal 103 which are in the form of light. Hence, the regenerator 105 outputs an optical signal only when both the optical signal 103 and the clock signal are present.

The optical AND gate for the regenerator 105 is achievable with four-photon mixture taught in previously mentioned Japanese patent Laid-Open Publication No. 5-346599. The optical AND gate regenerates an optical clock signal in the form of light, i.e., without transforming it to an electric signal. Hence, the AND gate can regenerate even a n optical signal of high bit rate without any limitation ascribable to the frequency characteristic of an electric circuit. However, the wavelength of the optical signal is changed.

The mode locked laser diode usable as the optical clock generator 108 outputs the optical clock signal via the same port as it receives the optical signal for separating the clock component, as stated earlier. Therefore, the laser diode must separate only the optical clock signal and deliver it to the regenerator 105 via the beam splitter 106.

Further, because the optical device for separating the optical clock signal is implemented by the beam splitter 106, only one half of the optical signal 104 is fed to the clock generator 108, i.e., the other half cannot be used as the optical signal 109. In addition, only one half of the optical clock signal output from the clock generator 108 is input to the regenerator 105 while the other half is returned to the beam splitter 102. As a result, the optical clock signal cannot be effectively input to the regenerator 105.

Figure 2:
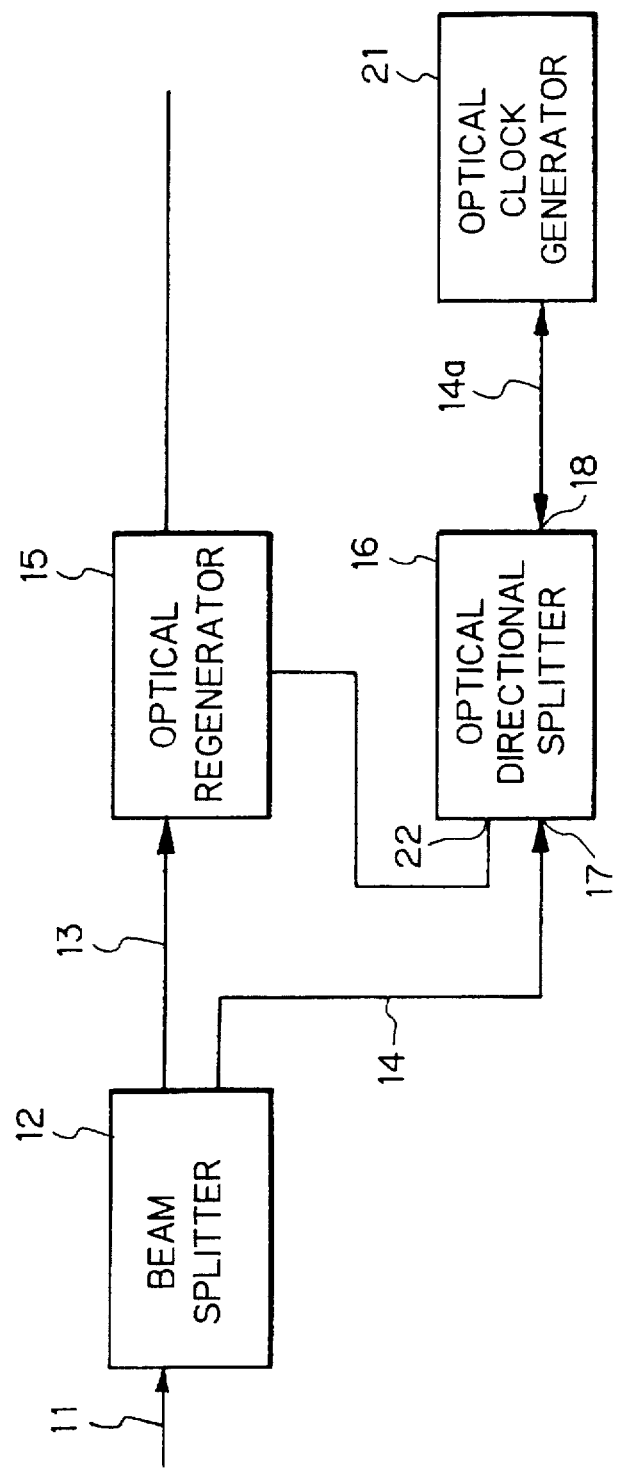
FIG. 2 is a block diagram schematically showing an optical regenerating circuit embodying the present invention.

Referring to FIG. 2, an optical regenerating circuit embodying the present invention is shown. As shown, an optical signal 11 is transmitted through an optical fiber with a preselected bit rate. The waveform of the signal 11 is deteriorated during the course of transmission over a long distance. The signal 11 is split into optical signals 13 and 14 by a beam splitter 12. The optical signal 13 is input to an optical regenerator 15. The optical signal 14 is input to a first port 17 included in an optical directional splitter 16, and then output as an optical signal 14a from a second port 18 also included in the directional splitter 16. The signal 14a is sent to an optical clock generator 21 via an optical fiber.

The optical clock generator 21 is implemented by a mode locked laser diode which receives an optical signal via a preselected input/output port and sends an optical clock signal synchronous to a clock component included in the received signal via the same input/output port. The optical clock signal is output via the same port as the input light is incident, and sent to the second port 18 of the directional splitter 16 via the fiber. The clock signal is fed from a third port 22 further included in the directional splitter 16 to the regenerator 15. The regenerator 15 is implemented by a n optical AND gate called a nonlinear optical loop mirror. With the optical AND gate, it is possible to AND the optical clock signal and optical signal 13 in the form of light.

As stated above, the optical signal 14 and optical clock signal are separated from each other by the optical directional splitter 16. The optical signal input to the first port 17 of the splitter 16 is output from the second port 18 substantially without any loss. In addition, the optical clock signal input to the second port 18 is output from the third port 22 substantially without any loss. Consequently, the splitter 16 is capable of separating the optical signal and optical clock signal without noticeable attenuation which is unavailable with a beam splitter.

The directional splitter 16 may be constituted by a combination of optical isolators or an optical circulator.

Figure 3:
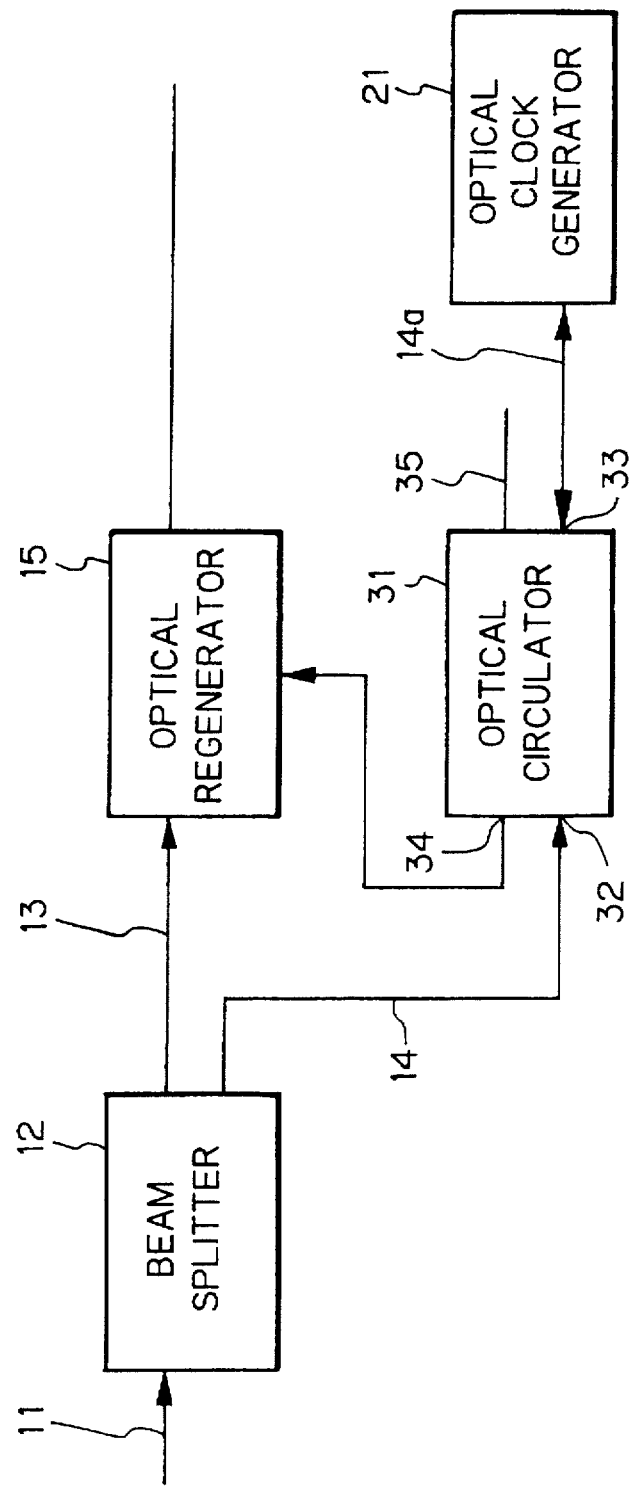
FIG. 3 is a schematic block diagram showing an alternative embodiment of the present invention.

FIG. 3 shows an alternative embodiment of the present invention. In FIG. 3, the same constituents as the constituents shown in FIG. 2 are designated by like reference numerals, and a detailed description thereof will not be made in order to avoid redundancy. As shown, an optical circulator 31 is substituted for the optical directional splitter 16. The circulator 31 has four input/output ports 32–35. Among the ports 32–35, only a first to a fourth port are used in the illustrative embodiment. Generally, the circulator 31 produces the optical signal received via the first input/output port 32 on the second input/output port 33, produces the optical signal received via the second input/output port 33 on the third input/output port 34, produces the optical signal received via the third input/output port 34 on the fourth input/output port 35, and produces the optical signal received via the fourth input/output port 35 on the first input/output port 32.

In the illustrative embodiment, the optical signal 14 output from the beam splitter 12 is fed to the first input/output port 32 of the circulator 31 and then fed from the second input/output port 33 to the optical clock generator 21. The optical clock signal output from the clock generator 21 is applied to the second input/output port 33 and then fed to the regenerator 15 via the third input/output port 34. The circulator 31 is capable of separating the optical signal input to the clock generator 21 and the optical clock signal output from the clock generator 21 with a minimum of pass loss.

In summary, it will be seen that the present invention provides an optical regenerating circuit having various unprecedented advantages as enumerated below:

(1) An optical signal input to optical clock generating means and an optical clock signal output from the same are separated by optical directional splitting means. This reduces the attenuation of light intensity ascribable to the separation.

(2) When the splitting means is implemented by an optical circulator, easy separation of the two different optical signals is promoted.

(3) The optical clock generating means is implemented by a mode locked laser diode. Hence, the clock generating means is capable of generating the clock signal whose frequency is equal to the bit rate of the optical signal, without the transform of the optical signal to an electric signal. This is also true even with an optical signal having a high bit rate.

(4) An optical AND gate ANDS input signals in the form of light. Hence, even an optical signal having a high bit rate can be regenerated with a shaped waveform.

Various modifications will become possible for those skilled in the art after receiving the teachings of the present disclosure without departing from the scope thereof.

What is claimed is:

1. An optical regenerating circuit comprising:
   optical directional splitting means for receiving an optical signal conveying digital data having a desired bit rate on a first port, producing said optical signal on a second port, and producing an optical signal input to said second port on a third port;
   optical clock generating means for receiving said optical signal from said second port on a preselected input/output port, generating an optical clock signal whose frequency is equal to the bit rate of said digital data, and feeding said optical clock signal from said preselected input/output port to said second port; and
   optical regenerating means for shaping and regenerating said optical signal conveying the digital information on the basis of said optical clock signal output from said third port.

2. A circuit as claimed in claim 1, wherein said optical directional splitting means comprises an optical circulator.

3. A circuit as claimed in claim 1, wherein said optical clock generator comprises a mode-locked laser diode.

4. A circuit as claimed in claim 1, wherein said optical regenerating means comprises an optical AND gate for directly performing an AND operation on said optical clock signal and said optical signal as light signals.

5. A circuit as in claim 1, wherein said optical directional splitting means comprises a combination of optical isolators.

6. A circuit as in claim 1, wherein said optical signal produced at said second port has a same strength as said optical signal input to said first port.

7. A circuit as in claim 1, wherein said optical clock signal produced at said third port has a same strength as said optical clock signal input to said second port.

8. A circuit for regenerating an optical signal comprising:
   an optical directional splitter for receiving said optical signal;
   an optical clock generator for receiving said optical signal from said optical directional splitter, said optical clock generator generating an optical clock signal having a frequency based on said optical signal and outputting said optical clock signal to said optical directional splitter; and
   an optical regenerator connected to said optical directional splitter, wherein said optical directional splitter transmits said optical clock signal to said optical regenerator, said optical regenerator receiving said optical signal and said optical regenerator shaping and regenerating said optical signal.

9. A circuit as in claim 8, wherein said optical directional splitter comprises an optical circulator.

10. A circuit as in claim 8, wherein said optical clock generator comprises a mode-locked laser diode.

11. A circuit as in claim 8, wherein said optical regenerator comprises an optical AND gate for directly performing an AND operation on said optical clock signal and said optical signal as light signals.

12. A circuit as in claim 8, wherein said optical directional splitter comprises a combination of optical isolators.

13. A circuit as in claim 8, wherein said optical signal output from said optical directional splitter has a same strength as said optical signal input to said optical directional splitter.

14. A circuit as in claim 8, wherein said optical clock signal output from said optical directional splitter has a same strength as said optical clock signal input to said optical directional splitter.

15. A circuit for receiving an input optical signal and regenerating said input optical signal and producing an output optical signal, said circuit comprising:
   a beam splitter having a first port, a second port and a third port, said first port for receiving said optical signal, said beam splitter splitting said optical signal into a first optical signal output from said second port and a second optical signal output from said third port;
   an optical directional splitter optically connected to said second port of said beam splitter and having a fourth port, a fifth port and a sixth port, said fourth port of said optical directional splitter receiving said first optical signal and said optical directional splitter outputting said first optical signal through said fifth port without changing said first optical signal;
   an optical clock generator optically connected to said optical directional splitter and having a seventh port, said seventh port receiving said first optical signal from said fifth port of said optical directional splitter, said optical clock generator generating an optical clock signal based on said first optical signal and outputting said optical clock signal to said fifth port of said optical directional splitter through said seventh port, said optical directional splitter outputting said optical clock signal through said sixth port without changing said optical clock signal; and
   an optical regenerator optically connected to said optical directional splitter and said beam splitter and having an eighth port, a ninth port and a tenth port, said eighth port of said optical regenerator receiving said second optical signal from said third port of said beam splitter and said ninth port of said optical regenerator receiving said optical clock signal from said sixth port of said optical directional splitter, said optical regenerator shaping and regenerating said optical signal and outputting said output optical signal from said tenth port.

16. A circuit as in claim 15, wherein said optical directional splitter comprises an optical circulator.

17. A circuit as in claim 16, wherein said optical clock generator comprises a mode-locked laser diode.

18. A circuit as in claim 17, wherein said optical regenerator comprises an optical AND gate for directly performing an AND operation on said optical clock signal and said second optical signal as light signals.

19. A circuit as in claim 15, wherein said optical directional splitter comprises a combination of optical isolators.

20. A circuit as in claim 8, wherein said first optical signal output from said fifth port of said optical directional splitter has a same strength as said first optical signal input to said fourth port of said optical directional splitter, and
   wherein said optical clock signal output from said sixth port of said optical directional splitter has a same strength as said optical clock signal input to said fifth port of said optical directional splitter.

* * * * *